(12) United States Patent
Agg

(10) Patent No.: US 7,713,003 B2
(45) Date of Patent: May 11, 2010

(54) GROUND ANCHORS

(75) Inventor: Charles Simon James Agg, Redhill (GB)

(73) Assignee: Platipus Anchors Limited (GB)

( * ) Notice: Subject to any disclaimer, the term of this patent is extended or adjusted under 35 U.S.C. 154(b) by 0 days.

(21) Appl. No.: 12/621,137

(22) Filed: Nov. 18, 2009

(65) Prior Publication Data
US 2010/0058680 A1 Mar. 11, 2010

Related U.S. Application Data

(63) Continuation of application No. 08/648,079, filed as application No. PCT/GB94/01065 on May 18, 1994, now abandoned.

(30) Foreign Application Priority Data

Nov. 3, 1993 (GB) ................................. 9322640.5

(51) Int. Cl.
*E02D 5/80* (2006.01)
(52) U.S. Cl. .................. 405/259.1; 52/155; 52/156; 52/163; 52/166
(58) Field of Classification Search ............. 405/259.1, 405/253, 254, 259.4; 52/155, 156, 162, 163, 52/164, 165, 166
See application file for complete search history.

(56) References Cited

U.S. PATENT DOCUMENTS

| 1,008,501 | A |   | 11/1911 | Van Ostrand | 52/163 |
|---|---|---|---|---|---|
| 1,245,176 | A |   | 11/1917 | Beard | 52/163 |
| 2,227,553 | A |   | 1/1941 | Paque | 52/153 |
| 3,282,002 | A |   | 11/1966 | Jefferson et al. | 52/162 |
| 3,342,444 | A | * | 9/1967 | Nelson | 52/165 |
| 3,896,596 | A |   | 7/1975 | Berger | 52/153 |
| 3,969,854 | A | * | 7/1976 | Deike | 52/163 |
| 4,044,513 | A |   | 8/1977 | Deike | 52/163 |
| 4,252,472 | A |   | 2/1981 | Moraly | 52/154 X |
| 4,320,608 | A | * | 3/1982 | Deike | 52/165 |
| 4,574,539 | A |   | 3/1986 | Deike | 52/163 |
| 4,611,446 | A |   | 9/1986 | Beavers et al. | 52/163 |

(Continued)

FOREIGN PATENT DOCUMENTS

AU 14780/76 12/1977

(Continued)

OTHER PUBLICATIONS

International Search Report from corresponding PCT/GB94/01065 dated Oct. 5, 1994.

(Continued)

*Primary Examiner*—Frederick L Lagman
(74) *Attorney, Agent, or Firm*—Ohlandt, Greeley, Ruggiero & Perle, LLP

(57) ABSTRACT

The ground anchors of the type which are attached to cables, rods and the like, which are driven into the ground and tilted transversely of the hole by tensioning the cable are provided. A ground anchor including a central hollow tubular body portion extending substantially along the length of the anchor and a pair of laterally projecting wings extending from opposing sides of the body portion, wherein the wings are bent at an angle to the horizontal plane, and a portion of an edge of each wing is bent at an angle to the plane of the wing.

19 Claims, 3 Drawing Sheets

U.S. PATENT DOCUMENTS

| | | | |
|---|---|---|---|
| 4,802,317 A | 2/1989 | Chandler | 52/163 |
| 5,031,370 A | 7/1991 | Jewett | 52/166 |
| 5,175,966 A * | 1/1993 | Remke et al. | 405/259.1 |
| 5,625,984 A * | 5/1997 | Chapman et al. | 405/259.1 |
| 5,649,788 A * | 7/1997 | Jewett | 405/244 |
| 5,689,918 A * | 11/1997 | Johnson | 52/153 |
| 5,815,993 A * | 10/1998 | Castola et al. | 52/166 |
| 6,237,289 B1 * | 5/2001 | Jewett et al. | 405/259.1 |
| 7,534,073 B2 * | 5/2009 | Stahm | 405/259.1 |

FOREIGN PATENT DOCUMENTS

| | | |
|---|---|---|
| EP | 0 208 153 | 3/1989 |
| EP | 0 313 936 | 5/1989 |
| FR | 79.29810 | 6/1981 |
| FR | 2470823 | 6/1981 |
| FR | 80.17491 | 1/1982 |
| FR | 2488301 | 2/1982 |
| FR | 84.18697 | 7/1986 |
| FR | 2575781 | 7/1986 |
| GB | 1279133 | 6/1972 |
| GB | 1555580 | 11/1979 |
| JP | 57/7784 | 1/1982 |

OTHER PUBLICATIONS

IPER from corresponding PCT/GB94/01065 dated Jul. 26, 1995.

* cited by examiner

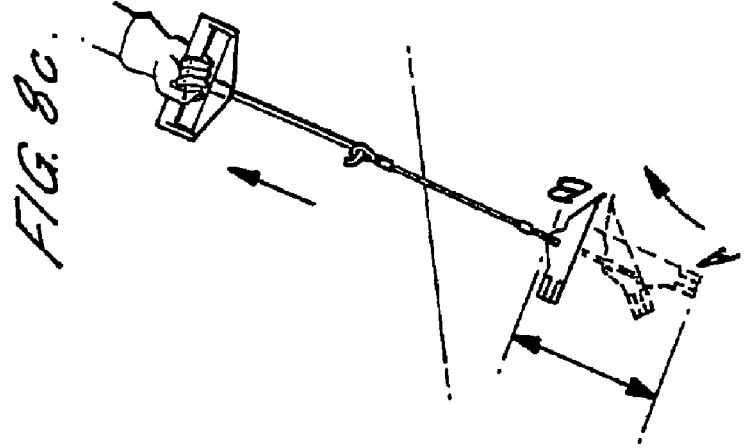
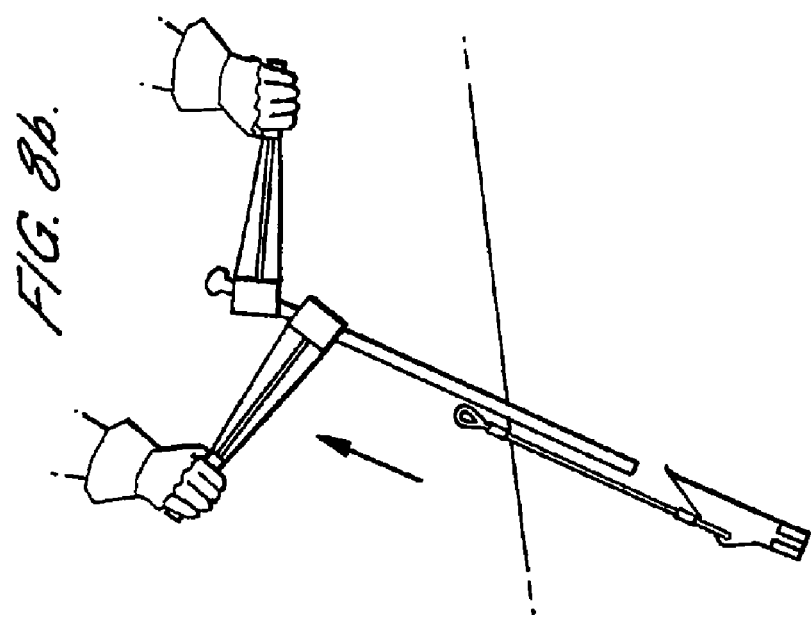
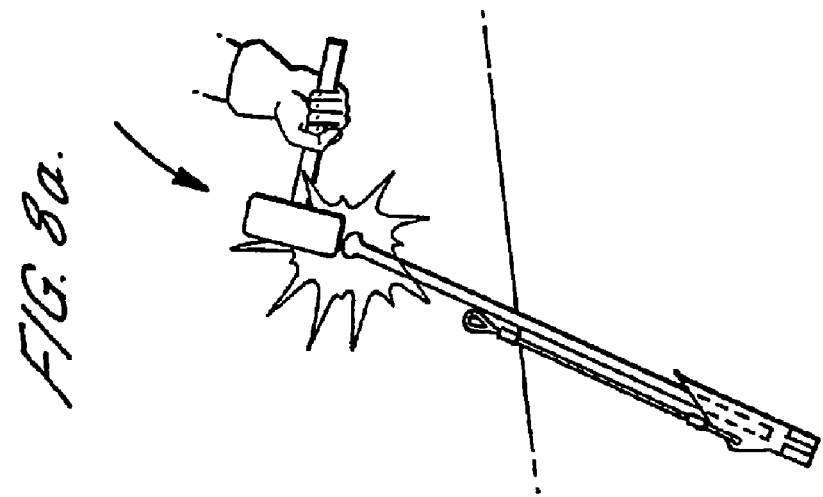

GROUND ANCHORS

CROSS REFERENCE TO RELATED APPLICATIONS

This application is a continuation of U.S. application Ser. No. 08/648,079 filed on Aug. 5, 1996, now abandoned which is a national stage entry under 35 U.S.C. §371 of International Application No. PCT/GB94/01065 filed on May 18, 1994, which claims the benefit of Great British Application No. GB9322640.5 filed on Nov. 3, 1993.

BACKGROUND OF THE INVENTION

1. Field of the Invention

The invention relates to ground anchors of the type which are attached to cables, rods and the like, which are driven into the ground and tilted transversely of the hole by tensioning the cable.

2. Description of Related Art

A variety of ground anchors already exist including tubular anchors, such as those described in GB-A-1555580 and EP-A-0208153. These anchors are driven into the ground and then rotated to a horizontal locked position. As the surface area of these anchors is not particularly large, they are not appropriate for some uses where a particular degree of strength and resistance to removal from the ground is required.

Improvements have been made to such anchors which resulted in the addition of wings to provide a greater planar or surface area to resist the anchors from being pulled from the ground once in their tilted locked position. Examples of such wing anchors are known from EP-A-0313936, U.S. Pat. No. 4,574,539 and U.S. Pat. No. 3,282,002. Each of these anchors has different specific features which enable the anchors either to be easily driven into the ground, to prevent its withdrawal therefrom, or to ease the ability to rotate the anchor once embedded in the ground.

BRIEF SUMMARY OF THE INVENTION

It is an object of the present invention to further improve anchors of the winged type in these respects.

According to the invention there is provided a ground anchor comprising a central hollow tubular body portion extending substantially along the length of the anchor and a pair of laterally projecting wings extending from opposing sides of the body portion, wherein the wings are bent at an angle to the horizontal plane, and a portion of an edge of each wing is bent at an angle to the plane of the wing.

Preferably an edge of each wing is rounded.

The wings are preferably curved at the trailing end of the anchor and preferably the anchor has a driving edge at a leading end thereof.

Edges of the wings at the leading end of the anchor may be sharpened.

Preferably a keel member is formed on the body portion, in which keel member is located an anchor eye. Alternatively a keel member is formed on the body portion, in which keel member is formed a socket.

The keel member preferably is convergent in a horizontal and/or vertical plane from the eye portion or socket to the driving edge.

A preferred embodiment of the invention will now be described, by way of example only, with reference to the accompanying drawings.

BRIEF DESCRIPTION OF THE SEVERAL VIEWS OF THE DRAWINGS

FIG. 8a-c are schematic views of the installation steps applied to a prior art anchor.

DETAILED DESCRIPTION OF THE INVENTION

Figure 1:
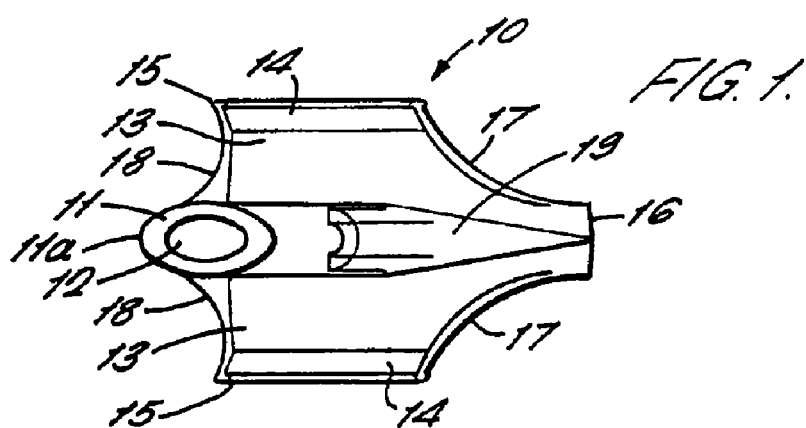
FIG. 1 is a plan view of an anchor according to the invention.
Figure 2:
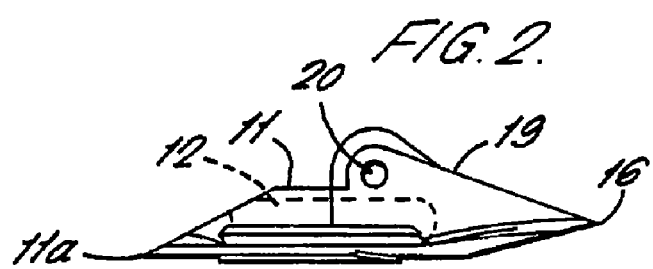
FIG. 2 is a side elevation of the anchor of FIG. 1.
Figure 3:
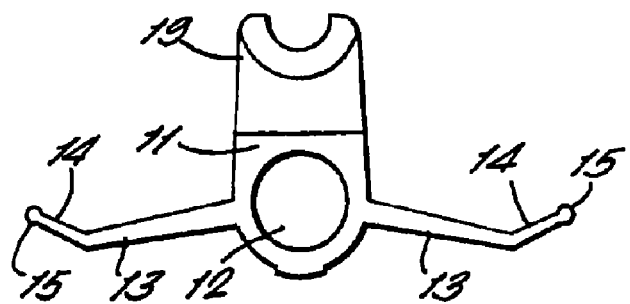
FIG. 3 is an end elevation of the anchor of FIG. 1.
Figure 4:
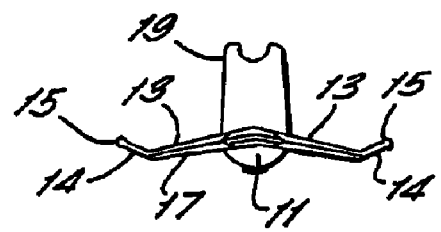
FIG. 4 is an opposite end elevation of the anchor of FIG. 1.
Figure 5:
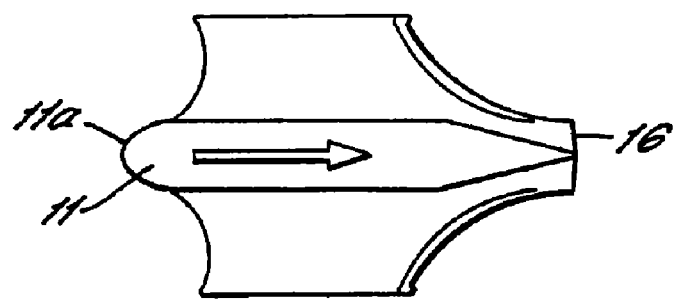
FIG. 5 is an underneath plan view of the anchor of FIG. 1.

The anchor 10 comprises a central substantially tubular body portion 11 having a blind bore 12 running axially thereof for receiving a driving tool.

Projecting from each side of the body portion 11 is a wing 13. These wings 13 project upwardly or downwardly at an angle to a horizontal plane through the anchor 10. At the side edges of the wings 13 are angled winglets 14 which project at an angle to the plane of the wings 13. The edges of the angled winglets 14 are provided with rounded edge beads 15.

At one end of the anchor 10, i.e. the leading end as the anchor is driven into the ground, the wings 13 meet at a flattened driving edge 16 which may be sharpened to a chisel point. The leading wing edges 17 which connect to the driving edge 16 may also be sharpened.

At an opposite end of the anchor 10, i.e. the trailing end as the anchor is driven into the ground, the trailing edges 18 of wings 13 may curve gently in an upwardly direction. At the trailing end of the anchor, the body portion 11 has a sloping nose 11a.

Above the central body portion 11 is formed an anchor keel 19 in which an anchor eye 20 is formed, to which eye 20 a cable may be attached. The high keel 19 extends from the anchor eye 20 and tapers downwardly to the driving edge 16. It may also taper in a horizontal plane to form a point adjacent the driving edge 16.

Figure 6:
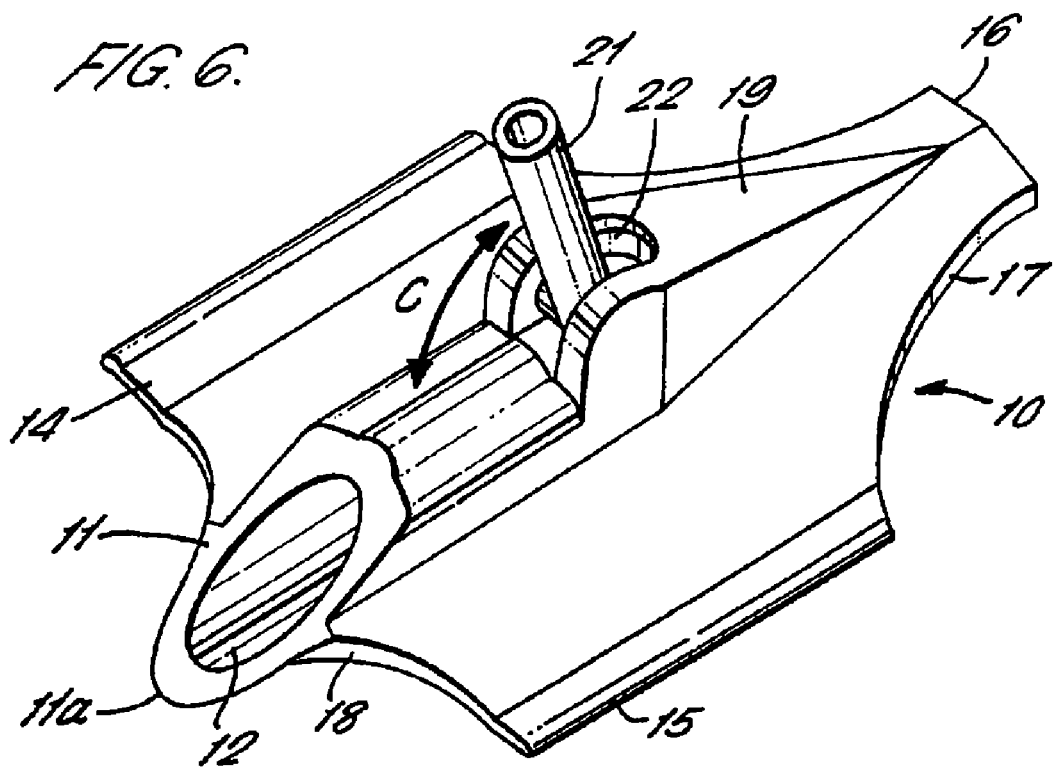
FIG. 6 is a schematic view of the anchor of FIG. 1 with the eye replaced by a swaged fitting.
Figure 7:
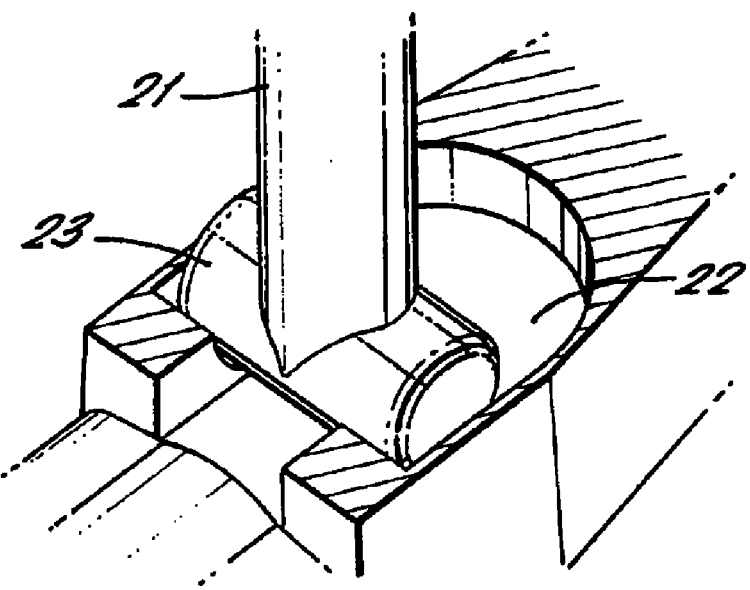
FIG. 7 is a partial schematic view of the swaged fitting of FIG. 6 with parts omitted for clarity.

In an alternative embodiment of the invention, as shown in FIGS. 6 and 7, the eye 20 is replaced with a T-shaped swaged fitting 21. The fitting 21 is inserted into a socket 22 formed in the keel 19 with the cross bar 23 of the T positioned longitudinally to the body 11. The fitting 21 can then be rotated through 90° to the position shown in FIGS. 6 and 7 whereby the cross bar 23 is anchored in the socket 22 under the keel 19. The fitting 21 can then pivot in the direction of arrow C. A wedge piece may be inserted behind the cross bar 23 to prevent the fitting 21 from rotating to a position whereby it could be pulled out of the socket 22.

In use, a cable or rod is attached to the anchor eye 20 or swaged fitting 21 and a drive rod (not shown) inserted into the bore 12. The anchor 10 is then driven into the ground, driving edge 16 first, to its installed position, by applying a force to the drive rod. FIG. 8a illustrates the installed position of a prior art anchor. The driving edge 16 splits the ground media by way of separating the upper side and lower side and compresses the media out of the way. The combination of using the sharpened edges 17 in conjunction with the chisel point driving edge 16 enhances the ability of the anchor 10 to cut through all variety of anchoring media. The high keel 19 further enhances significantly the ability of the anchor 10 to drive straight through difficult anchoring media.

Once at the desired depth, the drive rod is removed from the bore 12. The anchor 10 is rotated into a substantially horizontal position in the ground by applying a pulling force to the cable or rod thereby rotating the anchor 10 to its load locked position (see FIGS. 8b and 8c). Once the sharp nose 11a of the body 11 bites the back of the hole into which the anchor 10 is driven, this forms a fulcrum for the anchor 10 to turn about. The edges of the sloped portion of the nose 11a help to consolidate the turn of the anchor 10, and the wing edges 18, wing lets 14 and edge bead 15 all assist in the turning of the anchor 10.

The edges 18 of the wings 13 assist in the load locking process by reducing the "load lock distance". This is the distance A-B illustrated in FIG. 8c. This is achieved as the edges 18 bite into the ground and prevent upward slippage of the anchor 10. The edges 18 also enhance the speed at which the anchor turns.

The angled winglets 14 assist in focusing the main frustrum of the soil into the surface of the anchor 10 thereby increasing its load potential.

Additionally the shape and angle of the winglets 14 reduce the spill-off effect of a traditional flat winged anchor by concentrating the frustrum of the ground media within the anchor 10 itself. This reduces the mechanical edge shear effect of the ground media frustrum under high loads significantly and increases the load potential of the anchor 10.

The profile of the edge beads 15 is designed to reduce the mechanical shear of the soil at the edge of the wings 13 in high load conditions.

When the anchor 10 is in a load locked position, the angle of the wings 13 themselves increases the overall area of soil frustum by amplifying the angle of interaction, thereby creating an increased load potential.

The anchor 10 may be made from any suitable material depending on its required used, such as iron/steel, brass and copper based alloys, aluminum and possibly non-metallic materials.

What is claimed is:

1. A ground anchor comprising:
   a central hollow tubular body portion extending substantially along a length of the anchor;
   a pair of laterally projecting wings extending from opposing sides of the body portion, wherein the wings have a first portion extending at angle with respect to a horizontal plane, and a second portion extending at an angle with respect to the first portion, the second portion forming a rounded edge of each wing, the wings being curved at a trailing end of the anchor;
   a driving edge at a leading end of the anchor, the driving edge being sharpened; and
   a keel member formed in the body portion.

2. An anchor as claimed in claim 1 further comprising an anchor eye formed in the keel member.

3. An anchor as claimed in claim 2 wherein the keel member tapers downwardly to the driving edge.

4. An anchor as claimed in claim 3 wherein the keel member is convergent to a horizontal plane.

5. An anchor as claimed in claim 1 wherein the body portion includes a keel portion having a socket.

6. An anchor as claimed in claim 5 wherein the keel member tapers downwardly to the driving edge.

7. An anchor as claimed in claim 6 wherein the keel member is convergent to a horizontal plane.

8. A ground anchor comprising:
   a central body portion having a leading end, a trailing end, a pair of opposing sides, and a horizontal plane defined through the opposing sides;
   a blind bore defined in the central body portion at the trailing end;
   a pair of wings extending from the opposing sides at a negative angle to the horizontal plane, the pair of wings extending along the central body portion towards the leading end and meeting at a flattened driving edge;
   a pair of winglets depending from side edges of each wing in the pair of wings at a first positive angle to each wing in the pair of wings; and
   an anchor keel extending from the central body portion at a second positive angle to the horizontal plane.

9. An anchor as claimed in claim 8 wherein the flattened driving edge is sharpened to a chisel point.

10. An anchor as claimed in claim 8 wherein each wing in the pair of wings comprises a leading wing edge that connects to the flattened driving edge.

11. An anchor as claimed in claim 10 wherein each of the leading wing edges is sharpened.

12. An anchor as claimed in claim 10 wherein each of the leading wing edges is non-linearly tapered towards the flattened driving edge.

13. An anchor as claimed in claim 8 wherein each wing in the pair of wings comprises a trailing wing edge, the trailing wing edges being curved towards the trailing end.

14. An anchor as claimed in claim 8 wherein the central body portion has a slope decreasing from the leading end to the trailing end to define a sharp nose at the trailing end.

15. An anchor as claimed in claim 8 wherein each winglet in the pair of winglets comprises a rounded edge bead.

16. An anchor as claimed in claim 8 wherein the anchor keel further comprises an anchor eye.

17. An anchor as claimed in claim 16 wherein the anchor keel tapers from the anchor eye towards the flattened driving edge.

18. An anchor as claimed in claim 17 wherein the anchor keel forms a point at the flattened driving edge.

19. An anchor as claimed in claim 8 wherein the anchor keel further comprises a socket receiving a cross bar of a T-shaped swaged fitting.

* * * * *